R. Y. THOMAS.
RECORDING WEIGHING SCALE.
APPLICATION FILED FEB. 18, 1911.

1,011,273.

Patented Dec. 12, 1911.
2 SHEETS—SHEET 1.

Witnesses
Thomas Durant
Albert P. Brown

Inventor
Rufus Y. Thomas
By Church & Church
his Attorneys

R. Y. THOMAS.
RECORDING WEIGHING SCALE.
APPLICATION FILED FEB. 18, 1911.
1,011,273.
Patented Dec. 12, 1911.
2 SHEETS—SHEET 2.
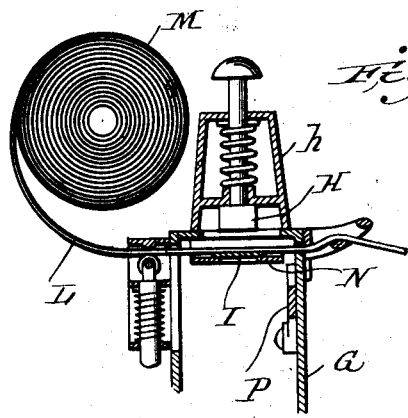
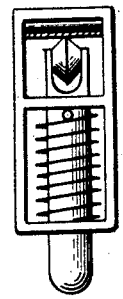
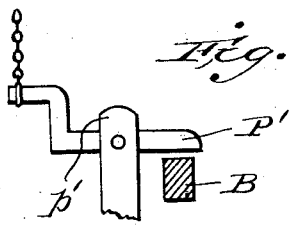
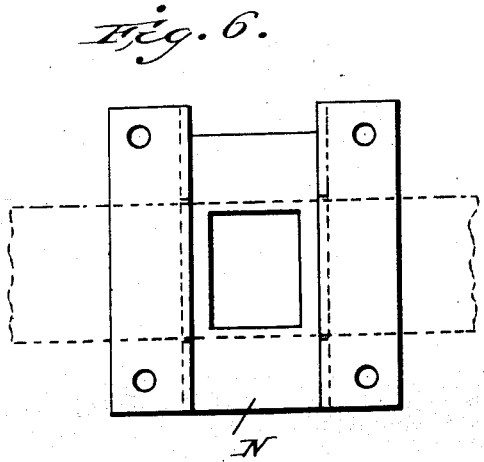
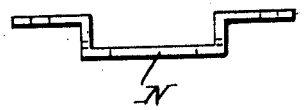
Witnesses
Inventor
Rufus Y. Thomas
By Church & Church
his Attorneys

UNITED STATES PATENT OFFICE.

RUFUS Y. THOMAS, OF NEW ALBANY, INDIANA, ASSIGNOR TO THE COMPUTING SCALE COMPANY, OF DAYTON, OHIO, A CORPORATION OF OHIO.

RECORDING WEIGHING-SCALE.

1,011,273.  Specification of Letters Patent.  Patented Dec. 12, 1911.

Application filed February 18, 1911. Serial No. 609,369.

*To all whom it may concern:*

Be it known that I, RUFUS Y. THOMAS, a citizen of the United States, residing at New Albany, in the county of Floyd and State of Indiana, have invented certain new and useful Improvements in Recording Weighing-Scales; and I do hereby declare the following to be a full, clear, and exact description of the same, reference being had to the accompanying drawings, forming a part of this specification, and to the figures and letters of reference marked thereon.

This invention relates to recording scales and is particularly applicable to that type of scales employed in the weighing of coal from the mines especially when the weights recorded form the basis for the miners' compensation.

The objects of the invention are to provide a recording scale mechanism which will not interfere with or render inaccurate the weighing mechanism and which will effectually lock the recording tape or paper strip when the scale beam begins to tip and hold the same locked until the weighing operation is completed.

Figure 1:
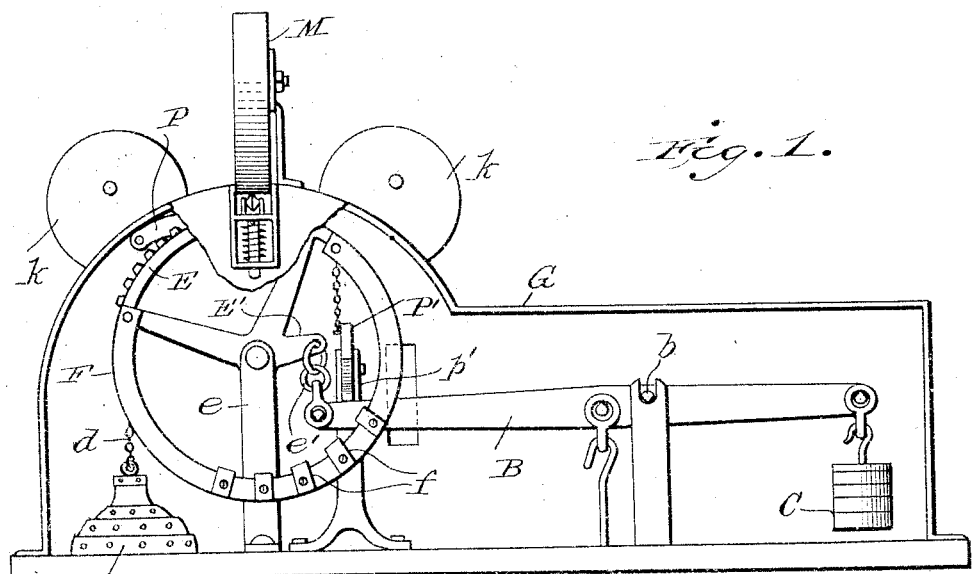
Figure 2:
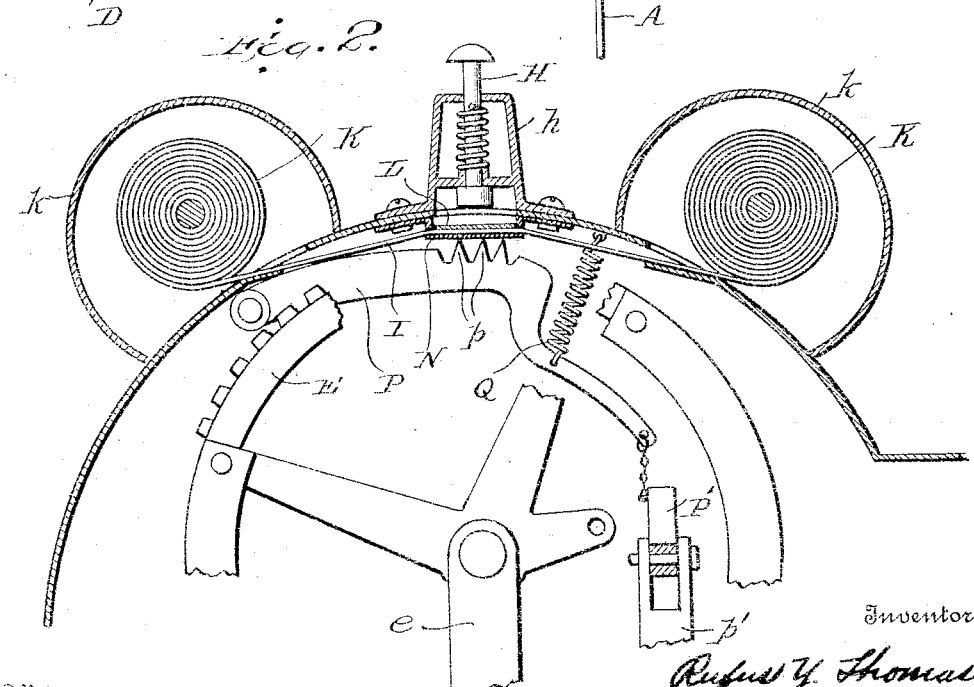

Referring to the accompanying drawings,—Figure 1 is an elevation with one side of the cover removed of a recording weighing mechanism embodying the present improvements; Fig. 2 is a sectional elevation showing the lock for the record strip; Fig. 3 is a detail sectional elevation showing the platen or stamp; Fig. 4 is a similar view of the record strip tension and creasing device; Fig. 5 is a detail of the lever or trigger for the record tape lock; Figs. 6 and 7 are details of the guide forming a part of the supporting mechanism for the record tape and ink ribbon.

Similar letters of reference throughout the several figures indicate the same parts.

The accompanying drawings illustrate what may be termed the upper structure of a scales, the mechanism illustrated being adapted for connection through a draft rod A with the beams and levers of any ordinary scale embodying the usual pan for coal or platform for the load to be weighed. At its upper end the draft rod A is pivotally connected with a beam B pivoted at $b$ and adapted for connection with counterbalancing mechanism for the load which may be a spring or springs as well understood, but in the preferred construction and as shown, consists of counterbalance weights. The minimum weight C is suspended from the rear end of the beam and the forward end of the beam is connected with the smaller of a series of pick-up weights D. When the load is great enough to lift the minimum weights C the pick-up weights are lifted in succession as the load is increased, all as is well understood in the art. The pick-up weights provide an efficient means whereby the deflection of the beam will be caused to take place in stages or steps as each successive weight comes into action, a feature which is desirable in recording scales where the record is printed from impression surfaces brought to the printing point in succession by the movement of the beam, inasmuch as the beam will come to rest at definite points which will correspond to the proper positioning of the impression surfaces. The impression surfaces or type faces are preferably on a printing segment E journaled in a standard $e$ and having an arm E' connected by links $e'$ with the beam, while the pick-up weights D are connected through a flexible connection $d$ with a segment F forming a part of or connected with the printing segment. For the purpose of adjustment, the segment F may be utilized as a carrier for adjustable sealing weights $f$ for securing accurate balancing of the parts.

The parts described are conveniently mounted in a casing G which may be made in halves or with one side removable and held in place by two locks, the key of one lock to be kept by the miner and the other by the operator, so as to prevent tampering with the mechanism without the knowledge of both. The printing segment is adapted to present the impression surfaces at a printing point near the top of the casing and in position opposite a platen or stamp H (Fig. 3) mounted to slide in a frame $h$ and to be depressed by hand when an impression is to be made.

Extending between the platen H and printing segment is an ink ribbon I adapted to be wound back and forth between reels or spools K journaled in houses $k$ on the casing G and above the ink ribbon and transverse thereto is a record strip or paper tape L which may be drawn from a support or reel M before or after each load is weighed, but which is automatically locked against movement in either direction during the weighing of the load or during the time the beam is deflected by the load. The ink ribbon and the record tape may be guided and supported adjacent the printing point by a guide plate N secured on the inner side of the casing by the bolts which also secure the housing for the stamp in position on the outside of the casing. Said guide plate has an opening therethrough at the printing point and transverse guide ways for the ribbon and tape, as will be readily understood from Figs. 6 and 7. The lock for the record tape is arranged within the casing and engages the tape in proximity to the printing point. It consists of a pivoted member P having tape engaging or penetrating points p and normally under pressure as by a spring Q tending to lock or penetrate and hold the tape against movement. The end of the pivoted member P is connected with a lever or release trigger P' pivoted on a standard p' and having one end projecting in position to be engaged by the beam so as to hold the lock released when the beam is in normal position with no load on the scale. Conveniently, the end of the lever P' projects over the end of the beam and is released by the initial downward movement of the beam, whereby the first portion of the load placed on the scale sets the tape lock and further movement of the beam is free from any influence of the lock which might tend to disturb the balance of the scale, for the beam immediately moves out of engagement with the lever leaving the record tape locked until the record is made, the load discharged from the pan and the beam returned to its normal position. The operator may then draw the record tape forward and the parts will be ready for another weighing.

Having thus described my invention, what I claim and desire to secure by Letters Patent of the United States, is:

1. In a recording weighing scale, the combination with a weight printing mechanism and beam for setting the same in accordance with the weight of the load, of a record tape support and a normally operative lock for the tape with connections intermediate the lock beam whereby the lock is held in unlocked position by the beam when in normal position and released to lock the tape by the initial movement of the beam in weighing.

2. In a recording weighing scale, the combination with a weight printing mechanism embodying a record tape guide, platen and impression segment, of a lock for the record tape, a beam, connections intermediate the lock and beam and with which the beam coöperates when in normal position to hold the lock released, connections between the beam and impression segment and load counterbalancing means for moving the beam in opposition to the load whereby when the counterbalance is overcome by the load the beam will be moved and the record tape will be locked.

3. In a recording weighing scale, the combination with a beam and counterbalancing means for controlling the movement of the beam by the load being weighed, of a printing segment operatively connected with the beam to present characters at a printing point to indicate the weight of the load, a record tape guide, a lock for the record tape, connections intermediate the lock and beam whereby the lock is held out of operative position by the beam when in normal position, and released to lock the tape by the initial movement of the beam in weighing a load.

4. In a recording weighing scale, the combination with a weight printing mechanism including a platen, a record tape support and a printing segment, and a beam connected with the segment for setting said segment in accordance with the weight of the load, of a lock for the tape embodying tape penetrating points, means tending to hold said points in engagement with the tape and a lever connected with the lock and projecting in the path of the beam whereby the lock is held released when the beam is in normal position.

RUFUS Y. THOMAS.

Witnesses:
  Geo. W. Kepler,
  H. Braum.